Patented Nov. 13, 1928.

1,691,388

UNITED STATES PATENT OFFICE.

IRA FREEMAN, OF CATARACT, INDIANA.

WELDING COMPOUND.

No Drawing.   Application filed May 10, 1926.   Serial No. 108,167.

This invention relates to welding compounds, and also and especially to the method of applying and using the same and has for its object to provide an efficient means to facilitate the joining of separate cast iron pieces by the use of this compound or flux and an electric arc flame, either by the actual joining of the separate cast iron parts or by filling in between the separate parts of cast iron, or in adding to or filling out portions of such cast iron.

More especially, this invention has for its object the production of a welding flux for welding cast iron articles and its application to the surface of the welding cast iron electrode.

The following are the ingredients used in such welding compound or flux:

Borax (or boracic acid); powdered charcoal; plaster of Paris; silicate of soda (water glass).

Equal portions by volume of borax, powdered charcoal and plaster of Paris are mixed in a dry state, after which a cast iron electrode, wetted with silicate of soda or water glass, and while so wetted is coated with the aforesaid mixture.

The following steps are employed in mixing and applying the above mentioned ingredients:

1st. The borax, powdered charcoal and plaster of Paris are mixed in equal parts by volume.

2nd. The cast iron rod to be used as an electrode is dipped in or thoroughly covered with the silicate of soda (water glass).

3rd. The surface of such cast iron electrode so covered or wetted with such silicate of soda (water glass) is then coated and covered with the powdered dry mixture and then left to dry, or the said wetted cast iron electrode may be dipped into the water glass and then rolled in and covered with said mixture and then left to dry.

As illustrative of one method of applying the invention, a cast iron rod $\frac{1}{16}$ to $\frac{3}{8}$ inch in diameter and 18 inches in length may be coated as above described and after being mounted in a proper handle as is in common use by electrode welders, said rod is connected to the source of electric current of sufficient capacity to melt the end of the cast iron rod after an arc is struck as usual. The free end of the rod is caused to contact with the edges of the hole or other openings in or between the cast iron article to be welded together or filled in, or to the surface of the cast iron article to be added to. The rod is then drawn back to strike an arc between the rod and the article.

The electric arc melts both the surface of the cast iron article and also the cast iron rod coated with such flux at the same time at the point where the electric arc passes from one to the other and the melted rod is mixed with the melted part of the cast iron article, thus forming a mass exactly like the metal adjoining or one homogeneous mass, the cast iron electrode being melted and consumed and deposited in the melted form on to the cast iron mass being worked upon.

In the use of this flux, the outside coating of the rod or the said cast iron electrode resists the heat a little longer than the cast iron rod itself, so that the cast iron rod is melted faster than the outside coating and the free end of such rod is from $\frac{1}{8}$ to $\frac{1}{4}$ of an inch shorter than the outside coating which remains as a short tube, and in this way protects the melted rod and guides the liquid iron to the proper place on the body worked upon. In the use of this rod as aforesaid, the electric arc does not break when the rod is withdrawn from its contact for a distance as great as $\frac{3}{4}$ of an inch and the liquid iron, as it flows from such cast iron electrode so coated with such flux, is not permitted to splatter or flow away from the place of deposit desired by the operator, but on the other hand, is held in place and flows in a liquid form to its proper place of deposit as desired by the operator, and so cools in such proper place of deposit.

What is claimed is:

A welding compound, comprising a dry mixture of equal parts by volume of borax, powdered charcoal, and plaster of Paris, and a solution of silicate of soda as a binding agent.

In testimony whereof he affixes his signature.

IRA FREEMAN.